United States Patent
Sandmann et al.

(10) Patent No.: US 9,500,751 B2
(45) Date of Patent: Nov. 22, 2016

(54) APPARATUS, SYSTEM AND METHOD FOR READING OUT X-RAY INFORMATION STORED IN STORAGE PHOSPHOR PANELS

(75) Inventors: Patrick Sandmann, Munich (DE); Günther Schindlbeck, Munich (DE); Heribert Hammer, Munich (DE)

(73) Assignee: AGFA HEALTHCARE NV, Mortsel (BE)

( * ) Notice: Subject to any disclaimer, the term of this patent is extended or adjusted under 35 U.S.C. 154(b) by 82 days.

(21) Appl. No.: 14/344,963

(22) PCT Filed: Aug. 13, 2012

(86) PCT No.: PCT/EP2012/003452
§ 371 (c)(1),
(2), (4) Date: Mar. 14, 2014

(87) PCT Pub. No.: WO2013/041169
PCT Pub. Date: Mar. 28, 2013

(65) Prior Publication Data
US 2014/0361201 A1    Dec. 11, 2014

(30) Foreign Application Priority Data
Sep. 21, 2011  (EP) .................................... 11007670

(51) Int. Cl.
*G01T 1/105* (2006.01)
*G01T 1/20* (2006.01)
*G03B 42/04* (2006.01)

(52) U.S. Cl.
CPC ........... *G01T 1/2014* (2013.01); *G03B 42/045* (2013.01)

(58) Field of Classification Search
CPC ............................ G01T 1/2014; G03B 42/045
USPC ........................................................ 250/585
See application file for complete search history.

(56) References Cited

U.S. PATENT DOCUMENTS

| 2,924,717 A | 2/1960 | Koerner et al. |
| 5,050,203 A * | 9/1991 | Mirlieb ................ G03B 42/045 378/167 |

(Continued)

FOREIGN PATENT DOCUMENTS

| DE | 2845077 C2 | 4/1980 |
| DE | 3610659 C1 | 3/1987 |

(Continued)

OTHER PUBLICATIONS

English translation of Official Communication issued in corresponding International Application PCT/EP2012/003452, mailed on Apr. 3, 2014.

(Continued)

*Primary Examiner* — David Porta
*Assistant Examiner* — Edwin Gunberg
(74) *Attorney, Agent, or Firm* — Keating and Bennett, LLP (57) ABSTRACT

An apparatus, a corresponding system, and a method for reading out X-ray information stored in a storage phosphor panel includes an input device, into which a cassette with a storage phosphor panel therein can be input, and a read-out device, in which the storage phosphor panel can be irradiated with stimulation light and the emission light excited in the storage phosphor panel is detected. In order to enable the cassette that has been input to be locked and/or opened as reliably as possible in conjunction with a simplified construction, at least one mechanical element which can be mechanically driven by a movement of the cassette upon the cassette being input into the input device locks and/or opens the cassette in the input device.

17 Claims, 6 Drawing Sheets

(56) References Cited

U.S. PATENT DOCUMENTS

| | | |
|---|---|---|
| 5,138,160 A | 8/1992 | Shimizu et al. |
| 5,308,994 A | 5/1994 | Ohta et al. |
| 5,440,146 A * | 8/1995 | Steffen et al. ............... 250/580 |
| 6,068,439 A | 5/2000 | Ohta |
| 7,459,691 B2 | 12/2008 | Schindlbeck et al. |

FOREIGN PATENT DOCUMENTS

| | | |
|---|---|---|
| EP | 0 219 821 A1 | 4/1987 |
| EP | 1 531 359 A1 | 5/2005 |
| GB | 2 100 881 A | 1/1983 |

OTHER PUBLICATIONS

Official Communication issued in International Patent Application No. PCT/EP2012/003452, mailed on Nov. 21, 2012.

* cited by examiner

APPARATUS, SYSTEM AND METHOD FOR READING OUT X-RAY INFORMATION STORED IN STORAGE PHOSPHOR PANELS

CROSS-REFERENCE TO RELATED APPLICATIONS

This application is a 371 National Stage Application of PCT/EP2012/003452, filed Aug. 13, 2012. This application claims the benefit of European Application No. 11007670.0, filed Sep. 21, 2011, which is incorporated by reference herein in its entirety.

BACKGROUND OF THE INVENTION

1. Field of the Invention

The present invention relates to an apparatus, a system and a corresponding method for reading out X-ray information stored in storage phosphor panels.

2. Description of the Related Art

The storing of X-rays penetrating an object, for example a patient, as a latent image in a so-called storage phosphor panel constitutes an option for recording X-ray images. In order to read out the latent image, the storage phosphor panel is irradiated with stimulating light and thereby stimulated to emit emission light. The emission light, the intensity of which corresponds to the image stored in the storage phosphor panel, is detected by an optical detector and converted into electrical signals. The electrical signals are further processed, as required, and finally made available for analysis, in particular for medical-diagnostic purposes, by transmitting them to a corresponding output device, such as for example a monitor and/or a printer.

In prior art apparatuses and systems, electromechanical actuators, mostly driven by electrical motors, are provided for locking and/or opening the cassette which has been inserted into the apparatus or the system containing the storage phosphor panel to be read out.

SUMMARY OF THE INVENTION

The problem addressed by the present invention is to provide an apparatus, a system and a corresponding method for reading out storage phosphor panels, the apparatus, system and method assuring a locking and/or opening of the inserted cassette that is as reliable as possible, while providing a straightforward structure.

Preferred embodiments of the present invention provide an apparatus, a system and a method as described below.

The apparatus according to a preferred embodiment of the present invention comprises an input device into which a cassette containing a storage phosphor panel can be loaded, and a read-out device in which the storage phosphor panel is irradiated with stimulating light and in which the emission light which is thereby stimulated in the storage phosphor panel can be captured, and is characterized by at least one mechanical element which can be driven mechanically by a movement of the cassette when the latter is being loaded into the input device and which can thereby lock and/or open the cassette in the input device.

Apart from the apparatus, a system according to a preferred embodiment of the present invention comprises a cassette for receiving a storage phosphor panel.

A method according to a preferred embodiment of the present invention comprises the following steps: loading a cassette containing a storage phosphor panel into an input device and irradiating the storage phosphor panel with stimulating light and thereby capturing the emission light which is thereby stimulated in the storage phosphor panel, and is characterized in that at least one mechanical element is mechanically driven by a movement of the cassette when the latter is being loaded into the input device and thereby locks and/or opens the cassette in the input device.

Preferred embodiments of the invention are based on the thought that one or more mechanical elements that are driven or actuated solely by loading, in particular sliding, the cassette into the input device, keep the cassette in the input device and/or unlock and/or open the closure of the cassette. The mechanical energy for driving the mechanical elements hereby originates substantially from respectively the force or energy exerted by the operator when loading, in particular sliding in, the cassette. Maintaining, unlocking and opening the cassette hereby take place purely mechanically, for example, by using mechanical stops, latching devices, levers and tension springs, and without the electromechanical drives which are otherwise usually applied, such as electrical motors, electromagnets, relays or the like. The respective mechanical processes for maintaining, unlocking and opening the cassette are hereby triggered solely by loading the cassette—and in particular without light barriers or other detectors—, so that in this context it can also be considered a self-triggering mechanism. Analogously to the purely mechanical locking of the cassette and/or respectively the unlocking and opening of the closure of the cassette, the mechanical elements of course also allow a purely mechanically driven closing and unlocking of the closure respectively the unlocking and release of the cassette by an operator removing the cassette from the input device.

Preferred embodiments of the present invention allow to completely omit the electromechanical components which are usually employed for loading, unlocking and opening the cassette, which significantly simplifies the structure of apparatuses and systems and simultaneously allows, not least because of the associated reduction of the susceptibility to failure, a particularly reliable locking, unlocking and opening of the loaded cassette.

Preferably, the movement of the cassette being loaded into the input device is a movement carried out by an operator, in particular a translatory motion. As a result, additional electromechanical drives or the like can also be omitted when generating the movement of the cassette.

Moreover, it is preferred that at least one lever or a lever system is provided as mechanical element, whereby the movement of the cassette being loaded is able to bring the lever (system) into a position in which the lever or lever system locks the cassette in a predetermined position. To that end, elements, for example protrusions, can be provided on the lever or lever system that can engage in corresponding elements on the cassette, for example grooves, when the movement of the cassette displaces the lever or lever system in a closer position to the cassette. To that end, a reliable locking of the cassette is realized in a simple way.

In a further preferred embodiment, the mechanical element is provided in the form of at least one unlocking element which can be brought into a position, by the movement of the cassette being loaded, in which the unlocking element can unlock a closure provided at the cassette, in particular a pivotable cover flap. The unlocking element can, for example, be a bolt that is able to actuate a locking mechanism located in or on the cassette for locking and unlocking the cover flap. Thanks to this, the locking and unlocking of the closed cover flap of the cassette can also be realized in a simple and reliable way.

Preferably, the mechanical element is provided in the form of at least one opening element which can be brought into a position, by the movement of the cassette being loaded, in which the opening element can open a closure provided on the cassette, optionally only after the closure being unlocked by the unlocking element described above. The opening element can, for example, have the form of a pivotable gripper that engages on or in the closure of the cassette, that is pivoted by a position by the movement of the cassette and that thereby shifts the preferably pivotable closure into an open position. This allows achieving a reliable opening of the cassette by using simple mechanical device.

In a further preferred embodiment, a locking mechanism is provided which can lock the mechanical element(s) in the position in which they respectively lock the cassette in the predetermined position and unlock and open the closure, and can unlock the mechanical element(s) again from the position, i.e. release it (them) from the position. The mechanical elements are hereby kept in their respective functional position in a simple and reliable way, without additional, optionally electromechanical, devices being required.

Moreover, it is preferred to provide at least one tensioning element, in particular a tension spring or pressure spring, that pretension(s) the mechanical element(s) in the position in which, respectively, the cassette is locked in the predetermined position and the closure is unlocked and opened. This has the advantage that the mechanical elements, while the cassette is being removed from the input device, return by themselves into their original position and thereby respectively cause an automatic unlocking of the cassette and an automatic closing and locking of the closure.

A further preferred embodiment provides that the input device comprises a support and a carriage that is able to receive the cassette and that can be moved, together with the cassette it has received, relative to the support. Preferably, the carriage is movably mounted on the support. Moreover, it is preferred that the at least one mechanical element is provided on the carriage and can be moved, together with the carriage, relative to the support. One or more of the measures allow to realize the drive and in particular the temporal sequence of the actuation of multiple different mechanical elements in a particularly simple and reliable way.

Moreover, it is preferred to provide the support with one or more guiding elements that are able to modify the position of the at least one mechanical element while moving the carriage relative to the support. The guiding elements can be, for example, a stop for the at least one opening element which, when contacting the stop, cooperates with it in such a way that, for example, it is pivoted about a swivel axis. Alternatively or additionally, the guiding elements can be tapered elements that, for example, can interact with the lever or lever system in order to lock the cassette and accordingly can realize a locking and unlocking of the cassette in a predetermined position in the input device.

Preferably, a tensioning element, in particular a tension spring, is provided that can pretension the carriage with respect to the support through the movement relative to the support. The tensioning element can hereby, in particular, be formed and/or arranged in such a way that a movement of the carriage in a shifting direction relative to the support generates a restoring force in a direction opposite to the shifting direction. This has the particular advantage that part of the energy used by the operator when inserting the cassette is stored in the tensioning element and is available for an automatic return movement of the carriage bearing the cassette in its interior in a direction opposite to the forward feed direction, in particular after reading out the storage phosphor panel located in the cassette, without an additional return drive being required.

Moreover, it is preferred that at least one locking element, in particular a locking bolt, is provided that can lock the carriage with respect to the support, in particular automatically. In particular, the locking element and/or the carriage and/or the support are hereby formed in such a way that, when locking the carriage with respect to the support, the carriage can only be moved relative to the support in a shifting direction and not in a direction opposite to the shifting direction. Thanks to this, no further provisions, for example in the form of an unlocking mechanism, have to be made in order to enable a movement of the cassette and the carriage in the shifting direction in which the cassette is inserted in the apparatus by an operator, while at the same time the locking of the carriage prevents a movement in a direction opposite to the shifting direction. In order to release the carriage for shifting it in a direction opposite to the shifting direction, the locking element is preferably coupled to an unlocking mechanism, for example, a manually actuable lever, which, during or after being actuated by an operator, releases the locking element from its locking position.

Preferably, the input device, in particular together with the carriage and/or the support, is releasably coupled to further components of the apparatus, in particular to a housing in which the read-out device can be accommodated. In particular, a manually actuable unlocking mechanism is hereby provided which is able to unlock the input device, in particular together with the carriage and/or the support, from the apparatus. This allows an operator to remove the input device, optionally together with the cassette, from the apparatus, in particular from the housing, in a simple way if such should be required in case of a failure, for example in case of a failed transfer of the storage phosphor panel to a transport mechanism in order to be transported further to the read-out device, or for maintenance purposes.

In the system according to a preferred embodiment of the present invention, the cassette preferably comprises a locking element that is able to keep, in particular to lock, the closure, in particular the cover flap, of the cassette in a position which locks the opening, the locking element being actuable from outside the cassette. To that end, an actuating element is preferably provided in the lateral area of the cassette which is mechanically coupled to the locking element and which can be actuated from outside the cassette, for example by an unlocking bolt which can press the actuating element over a finite distance into the cassette.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
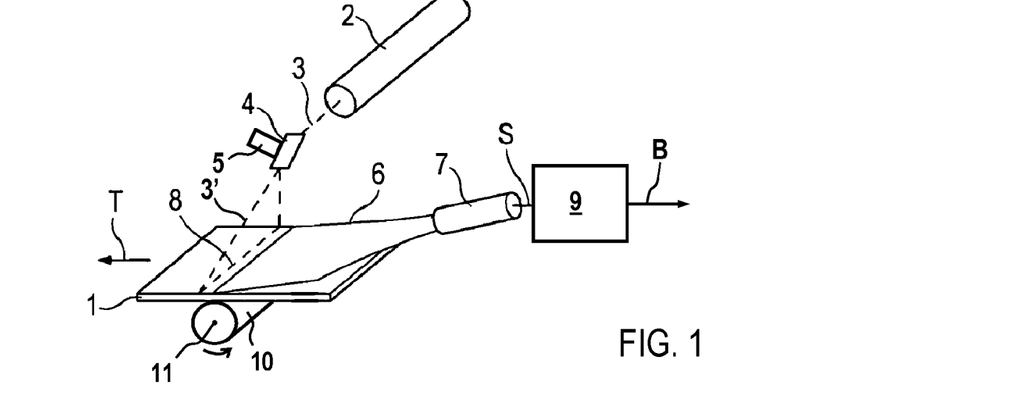
FIG. 1 a schematic representation of a read-out device for reading out storage phosphor panels.

FIG. 1 shows a read-out device for reading out a storage phosphor panel 1. A laser 2 generates a stimulating light beam 3 that is deflected by a deflection element 4 in such a way that the stimulating light beam moves along a line 8 across the storage phosphor panel 1 to be read out. The deflection element 4 has a reflecting area, in particular in the form of a mirror, that is made to move oscillatingly by a drive device 5. Alternatively, the deflection element 4 can have a polygon mirror that is made to move rotationally by a drive device 5, in this case a motor, and deflects the stimulating light beam 3 across the storage phosphor panel 1.

During the movement of the deflected stimulating light beam 3' across the storage phosphor panel 1, the storage phosphor panel emits emission light depending on the X-ray information stored therein, which emission light is collected by an optical collection device 6, for example an optical fiber bundle or a suitable mirror device, and detected by an optical detector 7, preferably a photomultiplier (PMT), and is thereby converted into a corresponding detector signal S.

The detector signal S is supplied to a device 9, in which digital image signal values B for individual image pixels of the read out X-ray image are derived.

The transport of the storage phosphor panel 1 in the transport direction T by a transport device has the effect that individual lines 8 of the storage phosphor panel 1 are successively read out, and a two-dimensional composite X-ray image is thereby obtained that is composed of individual pixels with respectively one associated image signal value B.

In the example shown, the transport device comprises a roller 10 that is put into rotation about the rotational axis 11 by a roller drive (not shown). The storage phosphor panel 1 is supported with its underside by the roller 10 and is transported in the direction T by the rotation of the roller 10 as a result of the frictional engagement occurring hereby.

In the displayed example, the roller 10 has magnetic, preferably permanently magnetic or electromagnetic, elements or areas that interact with magnetic or ferromagnetic elements or areas that are provided in the storage phosphor panel 1, so that the storage phosphor panel 1 is attracted by the roller 10, which significantly reinforces the frictional engagement and thereby assures a particularly reliable transport of the storage phosphor panel 1.

The magnetic elements or areas can be applied to the cylinder-shaped surface of the roller 10, for example in the form of a coating or a casing of the surface with a magnetic layer or a magnetic band. Preferably, the roller 10 itself is permanently magnetic or ferromagnetic, so that the magnetic layer or the magnetic band, respectively, is already held securely on the roller 10 due to magnetic attraction forces.

The magnetic elements or areas can, alternatively or in addition, however also be provided in the interior of a roller 10 that is designed as a hollow body, for example by disposing them on a carrier that is located in the interior of the roller 10. The hollow body of the roller 10 does not have to be magnetic or ferromagnetic in this case, but can also be paramagnetic or diamagnetic. Preferably, this is, in this case, a hollow body made of aluminum.

Figure 2:
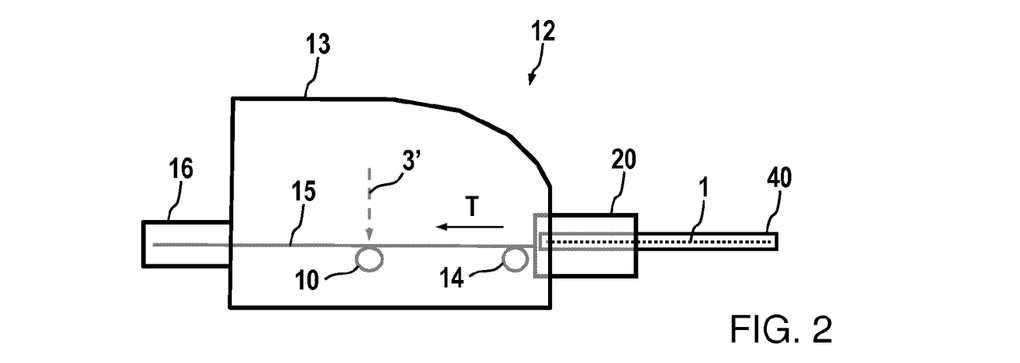
FIG. 2 a cross-sectional view of respectively an apparatus and a system comprising an input device.

FIG. 2 shows a cross-sectional view of respectively an apparatus 12 and a system for reading out storage phosphor panels. The apparatus 12 comprises a housing 13 in which the read-out device shown in FIG. 1 is arranged which is indicated in the selected representation by the roller 10 and the deflected stimulating light beam 3'.

A front area of the housing 13 of the apparatus 12 comprises an input device 20 into which an operator can insert a cassette 40 containing a storage phosphor panel 1. In the example shown here, the insertion is carried out substantially in a horizontal direction, the cassette 40 being oriented substantially horizontal while being inserted. In principle, however, it is also possible to arrange the input device 20 on another side of the housing 13, for example on its top side or in a transition area between the top side and the front side, whereby in this case the cassette 40 can be inserted into the input device 20 respectively in a vertical direction or in a direction at an angle to the vertical direction.

On the interior of the housing 13 of the apparatus 12, a removal device 14 is provided close to the input device 20. In the representation as chosen here, the removal device 14 is only represented in a strongly simplified way and is intended for removing the storage phosphor panel 1 being located in the inserted cassette 40 from the cassette 40 and for transporting it in the transport direction T to the roller 10 of the read-out device. A further role of the removal device 14 consists in transporting the storage phosphor panel 1, after being read out in the read-out device, back into the cassette 40 in the return transport direction which is opposite to the transport direction T.

The transport and the return transport, respectively, of the storage phosphor panel 1 in the housing 13 occur substantially along a transport path 15 that protrudes beyond the rear area of the housing 13. For that reason, the rear area of the housing 13 is provided—in the area of the transport path 15—with a corresponding opening through which the storage phosphor panel 1 can be transported at least partially out of the housing 13.

In order to protect the part of the storage phosphor panel 1 which protrudes from the housing 13 of the apparatus 12 from the effect of ambient light and in particular to prevent ambient light from penetrating through the opening provided in this area of the housing 13 into the interior of the apparatus 12, a light cover 16 is provided that forms a light-tight sealing of the rear end of the transport path 15. In particular, the light cover 16 prevents ambient light from penetrating into the interior of the housing 13 while the storage phosphor panel 1 is transported and/or read out along the transport path 15.

Figure 3:
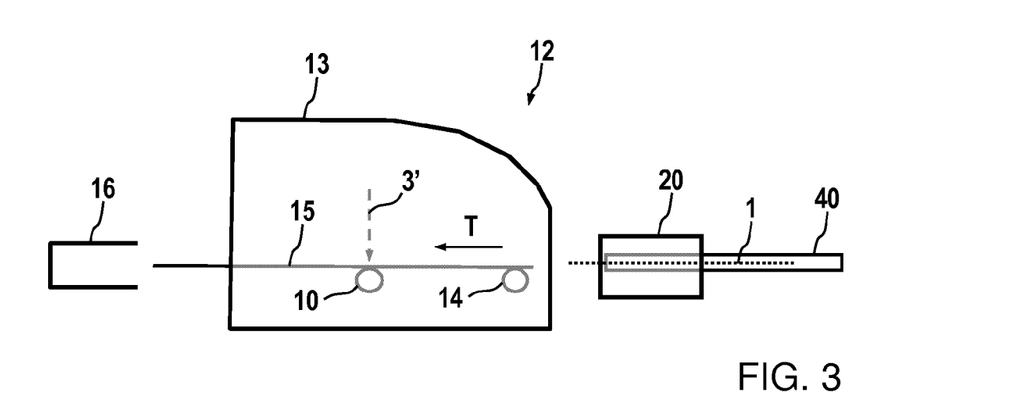
FIG. 3 a cross-sectional view of respectively the apparatus and system shown in FIG. 2 with a removed input device and light cover.

FIG. 3 shows a cross-sectional view of respectively the apparatus 12 and system shown in FIG. 2 with a removed input device 20 and light cover 16.

It may be necessary to remove the input device 20 from the housing 13 of the apparatus 12 when, for example, as a result of a failure, the storage phosphor panel 1 contained in the cassette 40 cannot or only partially be removed from the cassette 40 by the removal device 14 or when the removed storage phosphor panel 1 cannot be transferred to the roller 10. Such a failure is recognized by the control and monitoring electronics of the apparatus 12 and indicated by outputting a corresponding alarm signal, for example in the form of a light signal and/or an audio signal. The operator is thereby informed that a failure, in particular a so-called panel jam, occurs in the front area of the apparatus 12 which can be cleared by removing the removal device 20. By actuating an unlocking mechanism provided at the housing 13 and/or at the input device 20, the input device 20 can be released from the housing 13 of the apparatus 12 and then be removed by the operator. The panel jam can then be cleared, for example, by inserting a storage phosphor panel 1 which has been removed only partially from the cassette 40, as shown in FIG. 3, fully back into the cassette 40. After clearing the panel jam, the input device 20 is reconnected to the housing 13 of the apparatus, in particular plugged into it and locked.

In a further possible failure, the storage phosphor panel 1 is in the area of the rear end of the transport path 15 that is opposite to the input device 20 and cannot be transported any more away from this position by available transport devices, in particular by the roller 10. This failure too is preferably indicated by a display device provided at the housing 13 of the apparatus 12 or by a corresponding audio signal, whereupon the operator removes the light cover 16 in the area of the rear end of the transport path 15 from the housing 13, as shown in FIG. 3. Preferably, the light cover 16 can be coupled to the housing 13 by positive locking and/or frictional engagement. In order to achieve this, preference is given to coupling elements that can be actuated in a simple and quick way, such as, for example, cotter pins, plugs or snap-action mechanisms.

The apparatus 12 is hereby controlled in such a way that the roller 10 and/or the removal element 14 will no longer be able to transport the storage phosphor panel 1 as long as the light cover 16 is removed. In particular, the storage phosphor panel 1 is not read out anymore as soon as the light cover 16 has been removed from the housing 13.

According to a preferred embodiment of the present invention, the input device 20 is formed in such a way that the cassette 40 inserted into the input device 20 by an operator is locked, in particular clamped, and/or opened in the input device 20, whereby mechanical elements are provided for respectively locking and opening the cassette 40, the mechanical elements being driven and/or actuated purely mechanically, i.e. by the cassette 40 being loaded into the input device 20, without additional electrical or electromechanical driving or actuating elements, such as, for example, electrical motors, being required. This is illustrated hereinafter in greater detail in FIGS. 4 to 9.

Figure 4:
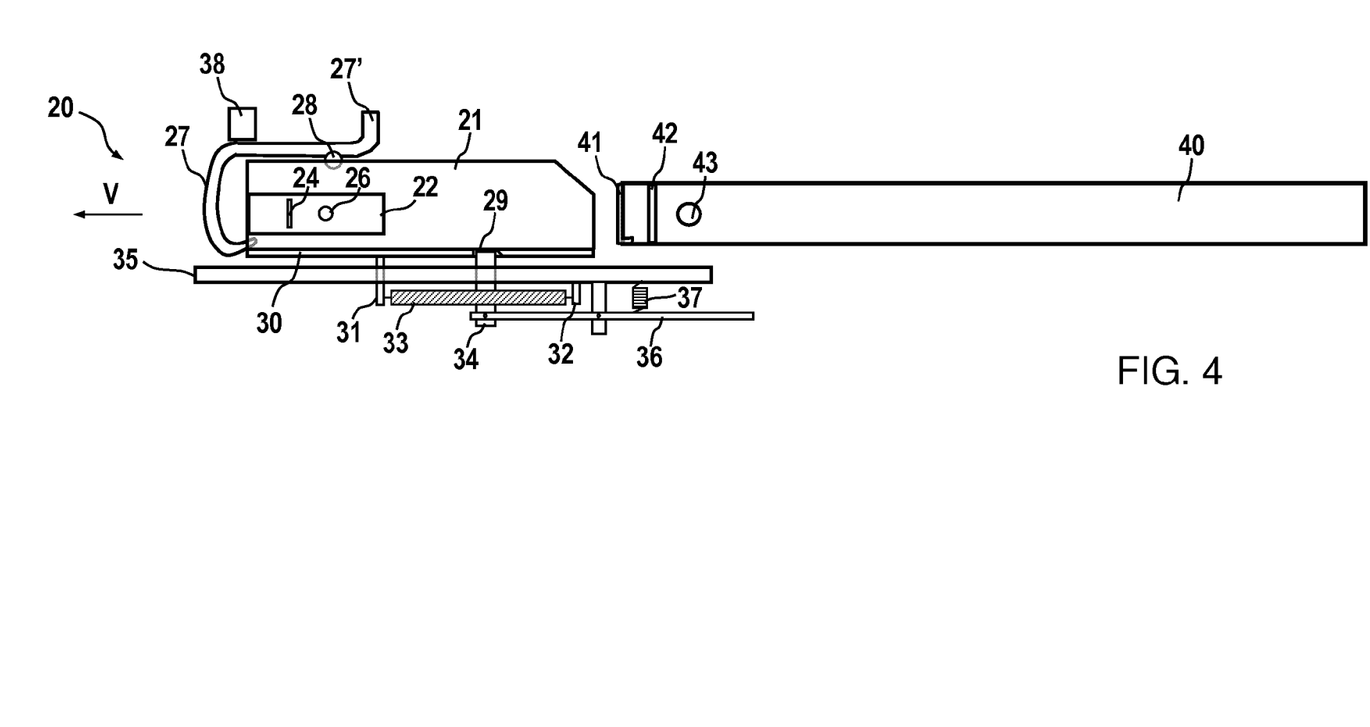
FIG. 4 a lateral view of an input device and a cassette.

FIG. 4 shows a side view of an input device 20 and a cassette 40. A face side of the cassette 40 comprises an opening that can be closed by a pivotable flap 41. In the closed condition shown, the flap 41 is locked by a locking slide (not shown) provided in the cassette 40 so that it cannot open by itself.

Preferably, the locking slide has the form as described in European patent EP 1 531 359 B1 and comprises an elongate rail with one or more locking openings that, with flap 41 being closed, can be brought into engagement with corresponding raised portions provided on the inside of the flap 41, thus allowing to lock the flap 41.

The respective position of the locking slide relative to the raised portions on the inside of the flap 41 and the associated engaging or non-engaging action in these raised portions are controlled by an externally actuable actuating element 43 which is coupled to the locking slide. Preferably, the locking slide and the raised portions on the inside of the flap 41 are disengaged and hence the flap 41 unlocked by pressing the actuating element 43 from the outside. As soon as the actuating element 43 is again released, it automatically returns to its original position, causing the locking slide to enter again in engagement with the raised portions provided at the flap 41.

At each of preferably two narrow sides of the cassette 40, a notch 42 is provided near the opening of the cassette 40 that allows locking the cassette 40 in a defined position in the input device 20.

The input device 20, which will now be described in greater detail with simultaneous reference to FIGS. 4 and 5, comprises a carriage 21 that is movably mounted on a support 35. At the bottom side of the base plate 30 of the carriage 21, a pin 31 is arranged that is run through a notch provided in the base plate of the support 35 and that is coupled to a pin 32 arranged at the bottom side of the base plate of the support 35 by a tension spring 33. In case the carriage 21 is shifted in the shifting direction V, the tension spring 33 is loaded, thus generating restoring forces the orientation of which is opposite to the shifting direction V.

In addition, locking bolts 34 are provided that are run through a perforation in the base plate of the support 35 and that can engage in recesses 29 provided on the base plate 30 of the carriage 21. The locking bolts 34 are mounted at the bottom side of the base plate of the support 35 using a lever 36, whereby a pressure spring 37 arranged on the side of the lever 36 that is opposite to the locking bolts 34 ensures that the locking bolts 34, with the lever 36 not being actuated, are moved in the direction of the carriage 21, in particular into the recess 29.

Preferably, each of the recesses 29 is formed in such a way that the carriage 21 cannot be shifted in a direction opposite to the shifting direction V while the locking bolt 34 engages in the recess 29. This is preferably achieved by a substantially vertically running flank in the area of the left side of the recess 29. Alternatively or additionally, the right side of the recess 29 is formed so that, when the carriage 21 is shifted in the shifting direction V, the locking bolt 34 is pressed downward, thus releasing the carriage 21 for being shifted in the shifting direction V. This is preferably achieved by beveling the flank in the area of the right side of the recess 29, the beveling being inclined in the shifting direction relative to the vertical, preferably by an angle of between 20° and 70°, in particular between 35° and 55°.

The front side areas of the carriage 21 are provided with a first lever 22 and a second lever 23 whose relative position to the respective side area of the carriage 21 is changeable. Preferably, both levers 22 and 23 are pivotably mounted to the carriage 21 with their end that is leading with respect to the shifting direction V. In principle, however, it is also possible to mount the levers 22 and 23 at the side areas of the carriage 21 in such a way that they can be moved towards and away from the carriage by a linear movement.

In the example shown, an elongated raised portion 24 and 25 is provided at respectively the first and second lever 22 and 23, the raised portions being formed and arranged at respectively the first and second lever 22 and 23 in such a way that they can engage in the notches 42 provided at both narrow sides of the cassette 40 when the cassette 40 is inserted up to the stop located in the carriage 21.

The first lever 22 is further provided with an unlocking bolt 26 whose form and dimensions and whose arrangement at the first lever 22 is chosen such that, with the cassette 40 in inserted condition, it can actuate, in particular press, the actuating element 43 provided at the narrow side of the cassette 40.

Hook-shaped opening elements 27 are furthermore pivotably mounted on the carriage 21 by hinges 28. The opening elements 27 are formed in such a way that they can engage, with a front end which is formed as a gripper, in the front area of the carriage 21. A substantially vertically running protrusion 27' is formed at the respective rear end of the opening elements 27.

Approximately at the height of the vertically running protrusion 27', a rail-like stop 38 is provided which is part of the support 35 and which is preferably connected to the base plate of the support 35. Corresponding connecting elements, for example vertically running braces between the stop 38 and the support 35, have been omitted in the selected representation for the sake of clarity.

Figure 5:
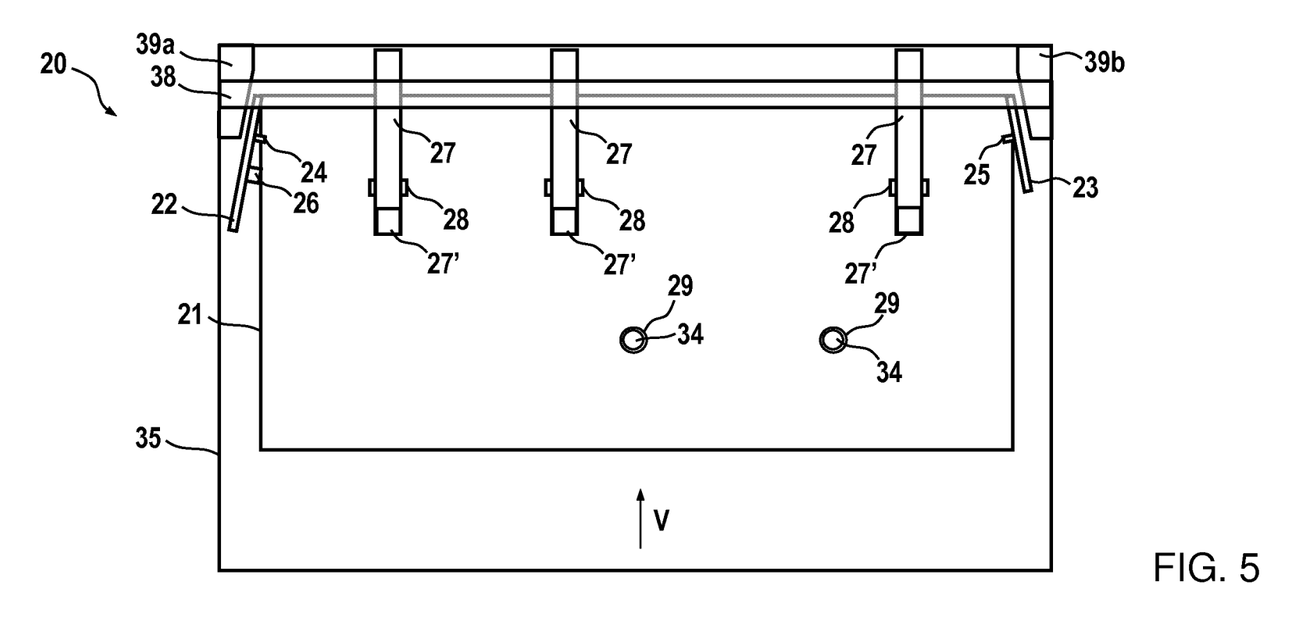
FIG. 5 a top view of the input device shown in FIG. 4.

At the support 35, in particular at the base plate of the support 35, a first wedge 39a and a second wedge 39b are arranged and formed so that they can actuate respectively the first and second lever 22 and 23 while the carriage 21 is being shifted from the position shown in FIGS. 4 and 5 in the shifting direction V.

Figure 6:
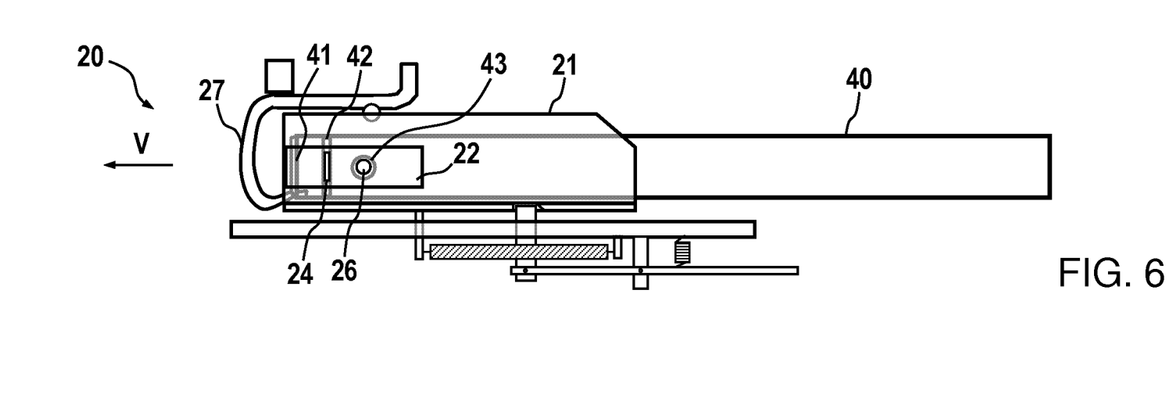
FIG. 6 a lateral view of the input device with an inserted cassette in a first phase of the insertion.

FIG. 6 shows a side view of the input device 20, with the cassette 40 in inserted condition, in a first phase of the insertion. An operator has inserted the cassette 40 in the carriage 21 of the input device 20 until the cassette 40 abuts on a stop (not shown) provided in the area of the front end of the carriage 21.

In this position, the notch 42 and the actuating element 43 in the side area of the cassette 40 are positioned at approximately the height of the elongate raised portions 24 and 25 provided at respectively the first lever 22 and second lever 23 (see FIG. 5) and of the unlocking bolt 26. Furthermore, the gripper-like ends of the opening elements 27 engage in recesses provided at the flap 41 of the cassette 40. Moreover, the above statements in connection with the FIGS. 4 and 5 apply correspondingly.

Figure 7:
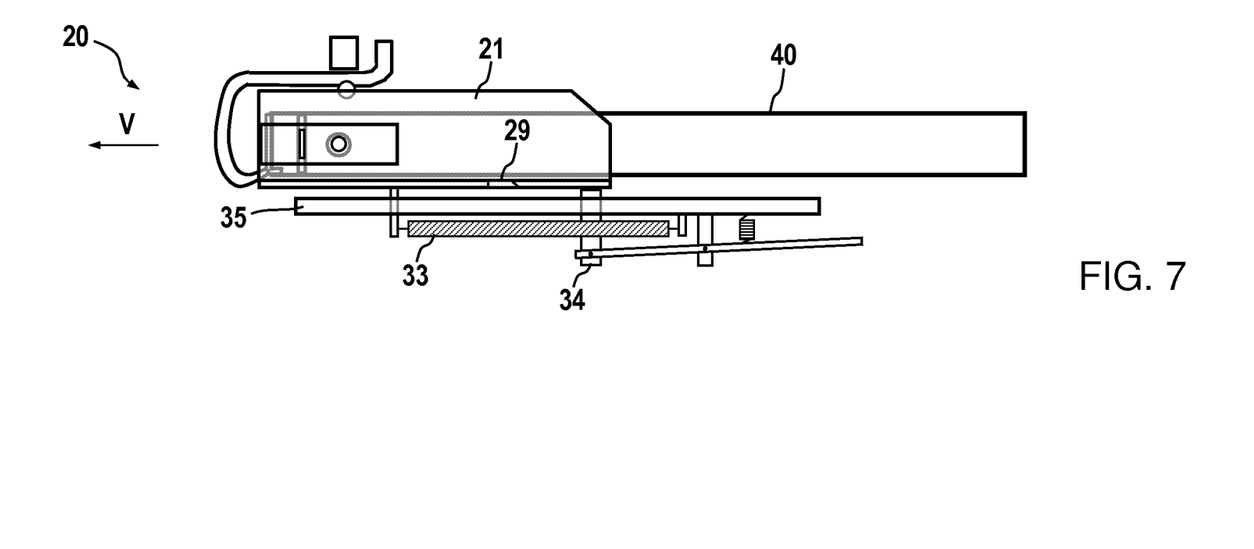
FIG. 7 a lateral view of the input device with an inserted cassette in a second phase of the insertion.

FIG. 7 shows a side view of the input device 20, with the cassette 40 in inserted condition, in a second phase of the insertion in which the operator has inserted the cassette 40, together with the carriage 21, so far in the shifting direction V that the locking bolt 34 and the recess 29 provided in the base plate 30 of the carriage 21 have been disengaged by vertically pressing downward the locking bolt 34 from the beveled flank of the recess 29. The relative movement between the carriage 21 and the support 35 that is triggered by the shifting causes the tension spring 33 to be loaded.

Figure 8:
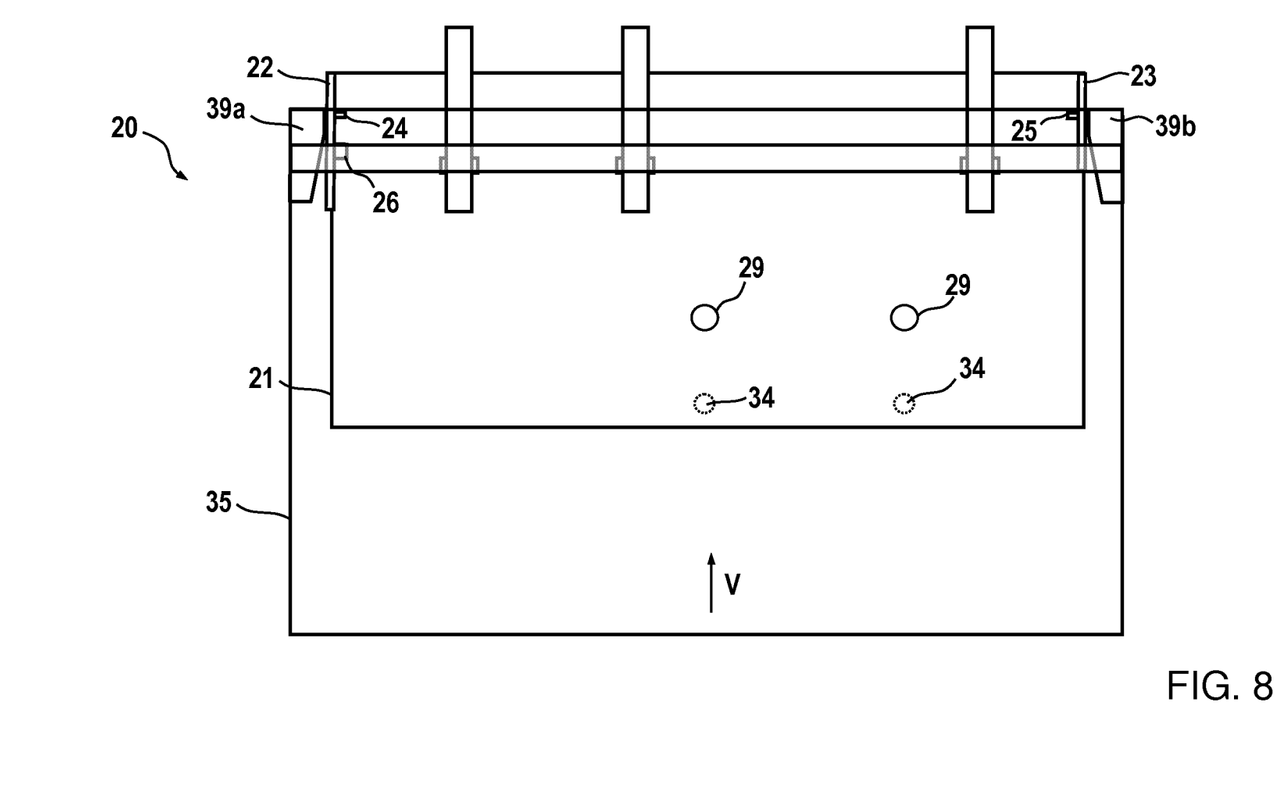
FIG. 8 a top view of the input device in the second phase of the insertion shown in FIG. 7, but without inserted cassette.

FIG. 8 shows a top view on the input device 20 in the second insertion phase shown in FIG. 7 in which, however, the inserted cassette has been omitted for the sake of clarity. As can be seen from FIG. 8, the locking bolts 34 are not engaged in the recesses 29 in the carriage 21. The shifting of the carriage 21 in the shifting direction V causes the first lever 22 and second lever 23, that are movably, in particular pivotably, mounted at the carriage 21, to be moved in the direction towards the cassette 40 (not shown) inserted in the carriage 21 so that the elongate raised portions 24 and 25 engage in the corresponding notches 42 in the side areas of the cassette 40 and thereby lock or fix the cassette 40 in its position relative to the carriage 21.

Furthermore, the unlocking bolt 26 provided at the first lever 22 presses on the actuating element 43 located in the side area of the cassette 40, whereby the actuating element 43 causes the locking slide located in the cassette 40 to release the flap 41 which had been locked by the locking slide, as already illustrated in greater detail in connection with FIG. 4.

In the preferred embodiment shown here, the movement of the first and second lever 22 and 23 in the direction of the cassette 40 that is triggered by shifting the cassette 40 together with the carriage 21 is realized by guiding respectively the first and second lever 22 and 23 along a respective wedge surface of respectively the first and second wedge 39a and 39b until they are finally maintained in the position shown in FIG. 8 by the surfaces that run parallel to the shifting direction V at the front end of the wedges 39a and 39b. Preferably, the levers 22 and 23 are coupled to return springs (not shown) that trigger an automatic return of the levers 22 and 23 when the carriage 21 has returned to an original position shown in FIGS. 4 to 6.

Figure 9:
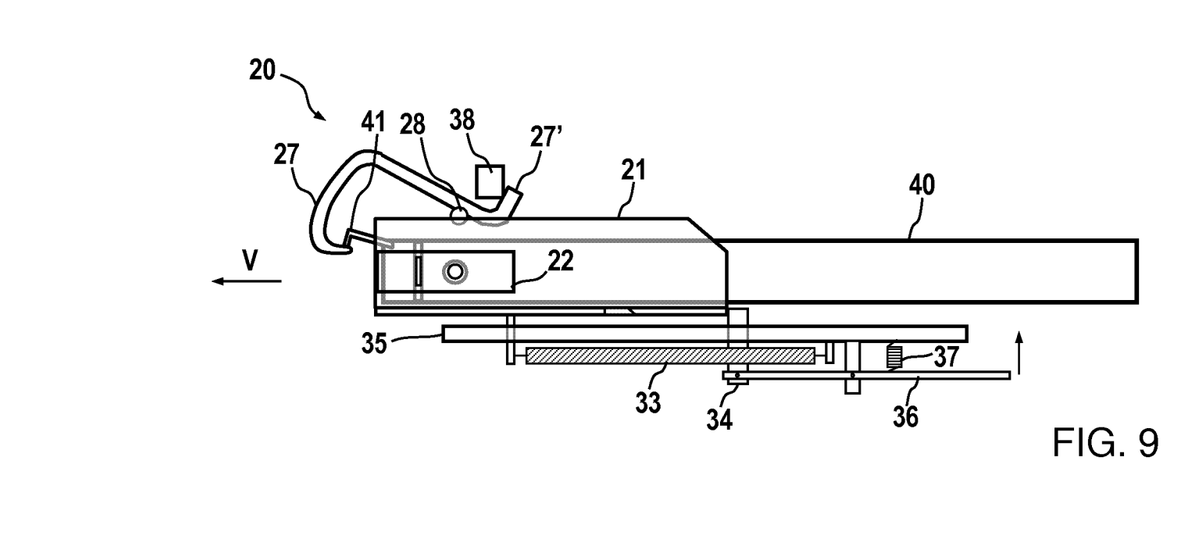
FIG. 9 a lateral view of the input device with an inserted cassette in a third phase of the insertion.

FIG. 9 shows a side view of the input device 2 in a third insertion phase in which the operator has shifted the cassette 40, together with the carriage 21, further in the shifting direction V, whereby the interaction between the vertical protrusions 27' and the rail-like stop 38 provided at the support 35 causes the opening elements 27 to be tilted around their hinges 28 and thereby engage in corresponding openings in the flap 41, causing the flap 41 to be opened. The storage phosphor panel 1 contained in the cassette 40 (see FIG. 2) can then be removed from the cassette 40 by a corresponding removal element 14 and be transported back into the cassette 40 after being read out.

In the third phase shown in FIG. 9, the locking bolt 34 abuts on the rear end of the base plate 30 of the carriage 21 so that the carriage 21, despite the tension spring 33 being loaded even stronger, cannot automatically move back against the forward feed direction V, but is locked in the position shown in FIG. 9. The restoring force generated by the tension spring 37 hereby causes the locking bolt 34 to move automatically from the unlocking position shown in FIG. 7 into the locking position shown in FIG. 9.

By locking the carriage 21 in the position shown in FIG. 9, the relative position of the wedges 39a and 39b with respect to the levers 22 and 23 and of the rail-like stop 38 with respect to the vertical protrusions 27' of the opening elements 27 is locked at the same time so that the cassette 40 in the phase shown in FIG. 9 stays fixed in the carriage 21 with the flap 41 opened.

After removing, reading out and returning the storage phosphor panel 1 back into the cassette 40, the operator can pull the lever 36 vertically upward so that the other end of the lever 36 moves the locking bolt 34 out of its locking position shown in FIG. 9. The restoring forces generated by the loaded tension spring 33 then automatically move the carriage 21 in a direction opposite to the shifting direction V, whereby the opening elements 27 that are preferably additionally pretensioned by spring elements (not shown) are first moved back from the position shown in FIG. 9 to the position shown in FIG. 7 and thereby close the flap 41 of the cassette 40.

As the return movement in the direction opposite to the shifting direction V continues, finally the phase shown in FIG. 6 is reached in which the levers 22 and 23 have again been moved away from the cassette 40 so that the unlocking bolt 26 is decoupled from the actuating element 43, thus relocking the closed flap 41 by the locking slide located in the cassette 40. Furthermore, the elongate raised portions 24 and 25 at respectively the levers 22 and 23 are again disengaged from the grooves 42 at the cassette 40 (see also FIG. 5) so that the operator can remove the cassette 40 out of the carriage 21 of the input device 20.

As demonstrated hereinbefore with reference to FIGS. 4 to 9, the fixation or locking of the cassette 40, the unlocking of the flap 41 and its opening in the described input device 20 are exclusively carried out by mechanical devices by using part of the mechanical energy which an operator exerts when inserting the cassette 40 in the input device 20 for directly or indirectly driving mechanical actuating elements in the form of the levers 22 and 23, including the raised portions 24 and 25, and the unlocking bolt 26 and the opening element 27. A further part of the energy applied by the operator is used for loading the tension spring 33 that allows the finished sequence of inserting the cassette 40 to be carried out automatically in the reverse order after the operator has actuated only the lever 36. This means that virtually no additional force or energy has to be applied by the operator when removing the cassette 40 inserted in the input device 20 from the input device 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An apparatus for reading out X-ray information stored in a storage phosphor panel, the apparatus comprising:
   an input device configured to receive a cassette containing a storage phosphor panel; and
   a read-out device configured to irradiate the storage phosphor panel with stimulating light and to detect emission light which is stimulated in the storage phosphor panel; and
   at least one mechanical element that is mechanically driven by a movement of the cassette when the cassette is being loaded into the input device and that locks and/or opens the cassette in the input device, the movement of the cassette being loaded into the input device being performed by an operator of the apparatus; wherein
   the input device includes a support and a carriage, and the carriage is configured to move together with the cassette relative to the support; and
   a tensioning element is configured to pretension the carriage with respect to the support by the movement of the cassette being loaded by the operator relative to the support such that, upon the movement of the carriage relative to the support in a shifting direction, the tensioning element generates a restoring force in a direction opposite to the shifting direction.

2. The apparatus according to claim 1, wherein the carriage is movably mounted to the support.

3. The apparatus according to claim 1, wherein the at least one mechanical element is mounted on the carriage and configured to move together with the cassette relative to the support.

4. The apparatus according to claim 3, further comprising at least one guiding element on the support and configured to modify a position of the at least one mechanical element when the carriage is being moved relative to the support.

5. The apparatus according to claim 1, further comprising at least one locking element configured to lock the carriage with respect to the support.

6. The apparatus according to claim 5, wherein the locking element, the carriage, and/or the support are configured such that, when the carriage is locked with respect to the support, the carriage is moved relative to the support in the shifting direction but cannot be moved in the direction opposite to the shifting direction.

7. The apparatus according to claim 1, further comprising a housing in which the read-out device is accommodated, wherein the input device is releasably coupled to the housing.

8. The apparatus according to claim 7, further comprising a manually actuable unlocking mechanism configured to decouple the input device from the apparatus.

9. The apparatus according to claim 1, wherein the at least one mechanical element includes at least one lever configured to lock the cassette in a predetermined position due to the movement of the cassette being loaded into the input device.

10. The apparatus according to claim 1, wherein the at least one mechanical element includes at least one unlocking element configured to unlock a closure on the cassette due to the movement of the cassette being loaded into the input device.

11. The apparatus according to claim 1, wherein the at least one mechanical element includes at least one opening element configured to open a closure on the cassette due to the movement of the cassette being loaded into the input device.

12. The apparatus according to claim 1, further comprising a locking mechanism configured to lock the at least one mechanical element in a predetermined position when the at least one mechanical element locks the cassette, to unlock and open a closure on the cassette, and to release the at least one mechanical element from the predetermined position.

13. The apparatus according to claim 1, further comprising at least one second tensioning element configured to pretension the at least one mechanical element in a predetermined position when the at least one mechanical element locks the cassette in the predetermined position, and to unlock and open a closure on the cassette.

14. A system for reading out X-ray information stored in a storage phosphor panel, the system comprising:
   a cassette configured to receive a storage phosphor panel; and
   an apparatus according to claim 1.

15. The system according to claim 14, wherein the cassette includes an opening and a closure configured to seal the opening.

16. The system according to claim 15, wherein the cassette includes a locking element configured to lock the closure in a predetermined position that seal the opening, and the locking element is configured to be actuated from outside the cassette.

17. A method for reading out X-ray information stored in a storage phosphor panel, the method comprising the steps of:
   loading a cassette containing a storage phosphor panel into an input device;
   irradiating the storage phosphor panel with stimulating light and detecting the emission light which is stimulated in the storage phosphor panel; and
   mechanically driving at least one mechanical element due to a movement of the cassette being loaded by an operator into the input device to lock and/or open the cassette in the input device; wherein
   the input device includes a support and a carriage, and, during the step of loading the cassette, the carriage is moved together with the cassette relative to the support; and
   during the movement of the cassette relative to the support, a tensioning element pretensions the carriage with respect to the support due to the cassette being loaded into the input device by the operator such that the tensioning element generates a restoring force in a direction opposite to the shifting direction.

* * * * *